US011077588B2

(12) United States Patent
Tobimatsu et al.

(10) Patent No.: US 11,077,588 B2
(45) Date of Patent: Aug. 3, 2021

(54) METHOD FOR MANUFACTURING FOAMING COMPOSITE MOLDING, IN-MOLD FOAMING MOLDING UNIT, FOAMING COMPOSITE MOLDING, AND MOLD FOR FOAMING COMPOSITE MOLDING

(71) Applicant: KANEKA CORPORATION, Osaka (JP)

(72) Inventors: Yuki Tobimatsu, Osaka (JP); Masahiko Sameshima, Osaka (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 16/146,280

(22) Filed: Sep. 28, 2018

(65) Prior Publication Data

US 2019/0030766 A1 Jan. 31, 2019

Related U.S. Application Data

(63) Continuation of application No. PCT/JP2017/006747, filed on Feb. 23, 2017.

(30) Foreign Application Priority Data

Mar. 29, 2016 (JP) .............................. JP2016-066701

(51) Int. Cl.
*B29C 44/12* (2006.01)
*B29C 39/28* (2006.01)
(Continued)

(52) U.S. Cl.
CPC ............ *B29C 44/1271* (2013.01); *A47C 7/20* (2013.01); *A47C 27/14* (2013.01); *B29C 33/12* (2013.01);
(Continued)

(58) Field of Classification Search
CPC ............ B29C 44/1285; B29C 44/1271; B29C 44/1276; B29C 33/12; B29C 33/16;
(Continued)

(56) References Cited

U.S. PATENT DOCUMENTS 5,043,114 A * 8/1991 Saito ..................... B29C 44/146
264/46.6
10,350,798 B2 * 7/2019 Nabeshima ......... B29C 44/1271
(Continued)

FOREIGN PATENT DOCUMENTS

JP S63-197406 A 8/1988
JP S63-135894 U 9/1988
(Continued)

OTHER PUBLICATIONS

International Search Report issued in International Application No. PCT/JP2017/006747, dated Apr. 4, 2017 (2 pages).
(Continued)

*Primary Examiner* — Stella K Yi
(74) *Attorney, Agent, or Firm* — Osha Bergman Watanabe & Burton LLP

(57) ABSTRACT

A method of producing a foamed composite molded product includes fixing an exposed part of an insert material on a fixing part provided in a mold, the insert material being inserted in an in-mold foamed molded product made of a thermoplastic resin; introducing a polyurethane liquid into the mold; and producing the foamed composite molded product by foaming the polyurethane liquid in the mold. The foamed composite molded product includes an in-mold foamed molded product unit including the insert material and the in-mold foamed molded product; and a polyurethane foam. At least part of the insert material is exposed to an
(Continued)

outside of the in-mold foamed molded product, and the in-mold foamed molded product unit and the polyurethane foam are integrated.

7 Claims, 9 Drawing Sheets

(51) Int. Cl.
A47C 27/14 (2006.01)
B29C 33/12 (2006.01)
B29C 39/10 (2006.01)
B29C 33/16 (2006.01)
A47C 7/20 (2006.01)
B60N 2/70 (2006.01)
B29K 105/04 (2006.01)
B29K 75/00 (2006.01)
B29K 705/00 (2006.01)
B29L 31/30 (2006.01)
B29L 31/00 (2006.01)

(52) U.S. Cl.
CPC ............ *B29C 33/16* (2013.01); *B29C 39/10* (2013.01); *B29C 39/28* (2013.01); *B29C 44/1285* (2013.01); *B60N 2/7017* (2013.01); *B29K 2075/00* (2013.01); *B29K 2105/04* (2013.01); *B29K 2105/048* (2013.01); *B29K 2705/00* (2013.01); *B29L 2031/3005* (2013.01); *B29L 2031/771* (2013.01)

(58) Field of Classification Search
CPC ..... B29C 39/10; B29C 39/28; B29C 44/0453; B29C 44/1219; B29C 44/1233; B29C 44/1266; B29C 44/206; B29C 49/20; B29C 70/747
See application file for complete search history.

(56) References Cited

U.S. PATENT DOCUMENTS

| 2008/0277955 | A1 | 11/2008 | Sato |
| 2010/0063170 | A1 | 3/2010 | Ishida et al. |
| 2010/0267850 | A1 | 10/2010 | Yoshida et al. |
| 2011/0221254 | A1 | 9/2011 | Lindsay et al. |
| 2011/0233962 | A1 | 9/2011 | Tada et al. |
| 2012/0286445 | A1 | 11/2012 | Ohta |
| 2013/0197112 | A1 | 8/2013 | Fukuzawa et al. |
| 2013/0230713 | A1 | 9/2013 | Yoshida et al. |
| 2013/0231409 | A1 | 9/2013 | Fukuzawa et al. |
| 2016/0158979 | A1 | 6/2016 | Nabeshima et al. |
| 2016/0167263 | A1 | 6/2016 | Nabeshima et al. |
| 2017/0057130 | A1 | 3/2017 | Sameshima et al. |
| 2017/0136659 | A1 | 5/2017 | Tobimatsu et al. |

FOREIGN PATENT DOCUMENTS

| JP | H4135709 A | 5/1992 |
| JP | H04-303402 A | 10/1992 |
| JP | H10-080337 A | 3/1998 |
| JP | 2003-201360 A | 7/2003 |
| JP | 2006-020735 A | 1/2006 |
| JP | 2006-117842 A | 5/2006 |
| JP | 2008-126632 A | 6/2008 |
| JP | 2008-239794 A | 10/2008 |
| JP | 2009297285 A | 12/2009 |
| JP | 2010-012687 A | 1/2010 |
| JP | 2011-230732 A | 11/2011 |
| JP | 2014-118474 A | 6/2014 |
| JP | 2015-136851 A | 7/2015 |
| JP | 2015/174340 A | 10/2015 |
| WO | 2007/034722 A1 | 3/2007 |
| WO | 2009/075208 A1 | 6/2009 |
| WO | 2015/016157 A1 | 2/2015 |
| WO | 2015016158 A1 | 2/2015 |
| WO | 2015/137363 A1 | 9/2015 |
| WO | 2015159691 A1 | 10/2015 |
| WO | 2016009820 A1 | 1/2016 |
| WO | 2016/152243 A1 | 9/2016 |

OTHER PUBLICATIONS

International Preliminary Report on Patentability issued in International Application No. PCT/JP2017/006747, dated Oct. 11, 2018 (10 pages).
Extended European Search Report issued in corresponding European Application No. 17773896.0; dated Sep. 17, 2019 (7 pages).
Office Action issued in corresponding European Application No. 17773896.0, dated Jul. 1, 2020 (5 pages).
Office Action issued in corresponding Chinese Application No. 201780021610.1; dated Jan. 17, 2020 (25 pages).
Office Action issued in the counterpart Japanese Patent Application No. 2018-508600, dated May 11, 2021 (5 pages).

\* cited by examiner

BEFORE POSITION FIXING

AFTER POSITION FIXING

METHOD FOR MANUFACTURING FOAMING COMPOSITE MOLDING, IN-MOLD FOAMING MOLDING UNIT, FOAMING COMPOSITE MOLDING, AND MOLD FOR FOAMING COMPOSITE MOLDING

TECHNICAL FIELD

One or more embodiments of the present invention relate to (i) a method of producing a foamed composite molded product, (ii) an in-mold foamed molded product unit, (iii) a foamed composite molded product, and (iv) a foamed composite molding mold.

BACKGROUND

Conventionally, it is common to produce a vehicle seat by integrating a metal wire into a main body of a seat made of polyurethane foam, so that the metal wire, which serves as an insert material for stabilizing the shape, is embedded in the main body of the seat.

The techniques for the integration into polyurethane foam are disclosed in, for example, Patent Literatures 1 and 2.

Patent Literature 1 discloses a technique for integrally molding polyurethane foam and synthetic resin fibers. According to the technique disclosed in Patent Literature 1, magnetic fibers are attached to synthetic resin fibers with use of an adhesive, and then the synthetic resin fibers are fixed to a magnet which is provided in an integrally molding mold. Then, while the synthetic resin fibers are fixed to the magnet, a polyurethane liquid is introduced into the mold, so that polyurethane foam and the synthetic resin fibers are integrally molded.

Patent Literature 2 discloses a technique for integrally molding polyurethane foam and a metal wire. According to the technique disclosed in Patent Literature 2, a metal wire is fixed to a magnet which is provided in an integrally molding mold.

CITATION LIST

Patent Literature

[Patent Literature 1]
Japanese Patent Application Publication, Tokukai, No. 2008-126632
[Patent Literature 2]
Japanese Patent Application Publication, Tokukai, No. 2006-020735

Recently, in view of achieving vehicle weight reduction, cost reduction, and the like, there has been proposed a configuration in which polyurethane foam is combined with an in-mold foamed molded product unit, which is molded from thermoplastic resin. The in-mold foamed molded product unit is obtained by insert molding in which an insert material (for example, a metal wire) is provided in an in-mold foamed molded product, made of thermoplastic resin expanded particles (for example, olefin resin). The in-mold foamed molded product unit is used as a core material of a vehicle seat. The vehicle seat is obtained by molding the in-mold foamed molded product unit integrally with the polyurethane foam and then covering the in-mold foamed molded product unit and the polyurethane foam with a seat cover.

It should be noted that in a case where the in-mold foamed molded product unit is placed in the foamed composite molding mold, a gap may occur between the in-mold foamed molded product unit and the foamed composite molding mold, so that a polyurethane liquid and polyurethane foam may enter the gap. As a result, unnecessary polyurethane foam is formed in the gap between the in-mold foamed molded product unit and the foamed composite molding mold. This leads to a difficulty in attaching a foamed composite molded product to a vehicle body or the necessity of removing the unnecessary polyurethane foam present in between the foamed composite molded product and the vehicle body.

In addition, the techniques disclosed in Patent Literatures 1 and 2 are not relevant to integrally molding an in-mold foamed molded product unit and polyurethane foam.

SUMMARY

One or more embodiments of the present invention relate to a foamed composite molded product production method, an in-mold foamed molded product unit, a foamed composite molded product, and a foamed composite molding mold, each of which makes it possible to prevent unnecessary polyurethane foam from being molded in an unintended part.

A foamed composite molded product production method in accordance with an aspect of one or more embodiments of the present invention is a method of producing a foamed composite molded product, the foamed composite molded product including: an in-mold foamed molded product unit; and polyurethane foam, the in-mold foamed molded product unit being (i) obtained by insert molding in which an insert material is provided in an in-mold foamed molded product made of a thermoplastic resin and (ii) configured so that at least part of the insert material is exposed to an outside of the in-mold foamed molded product, and the in-mold foamed molded product unit and the polyurethane foam being integrated, the method including the steps of: (a) fixing, with use of a fixing part provided in a mold, an exposed part of the insert material of the in-mold foamed molded product unit; and (b) introducing a polyurethane liquid into the mold. Note that the term "mold" here means a foamed composite molding mold.

An in-mold foamed molded product unit in accordance with another aspect of one or more embodiments of the present invention is an in-mold foamed molded product unit obtained by insert molding in which an insert material is provided in an in-mold foamed molded product made of a thermoplastic resin, in a case where the in-mold foamed molded product unit is placed in a mold, at least part of the insert material being exposed to an outside of the in-mold foamed molded product, at least on a side of the in-mold foamed molded product which side is in contact with the mold.

A foamed composite molded product in accordance with yet another aspect of one or more embodiments of the present invention is a foamed composite molded product including: an in-mold foamed molded product unit; and polyurethane foam, the in-mold foamed molded product unit being obtained by insert molding in which an insert material is provided in an in-mold foamed molded product made of a thermoplastic resin, the foamed composite molded product having an exposed surface at which the in-mold foamed molded product is exposed, and at least part of the insert material being exposed to an outside of the foamed composite molded product on an exposed surface side of the in-mold foamed molded product.

A foamed composite molding mold in accordance with still another aspect of one or more embodiments of the present invention is a foamed composite molding mold for producing a foamed composite molded product including an in-mold foamed molded product unit and polyurethane foam, the in-mold foamed molded product unit being (i) obtained by insert molding in which an insert material is provided in an in-mold foamed molded product made of a thermoplastic resin and (ii) configured so that at least part of the insert material is exposed to an outside of the in-mold foamed molded product, and the in-mold foamed molded product unit and the polyurethane foam being integrated in the foamed composite molded product by placing the in-mold foamed molded product unit in the foamed composite molding mold, the mold including: a fixing part which (i) fixes the insert material that is exposed and (ii) is provided so as to face an exposed part of the insert material in a case where the in-mold foamed molded product unit is placed.

With an aspect of one or more embodiments of the present invention, it is advantageously possible to prevent unnecessary polyurethane foam from being molded at an unintended part. It is also advantageously possible to prevent an in-mold foamed molded product unit and a foamed composite molding mold from being shifted.

BRIEF DESCRIPTION OF THE DRAWINGS

FIG. 2 illustrates a structure in which an insert material is exposed through an opening (or hole) made in an in-mold foamed molded product.

DETAILED DESCRIPTION OF THE EMBODIMENTS

The following description will discuss one or more embodiments of the present invention.

[Overview of Configuration of Foamed Composite Molded Product 1]

Figure 1:
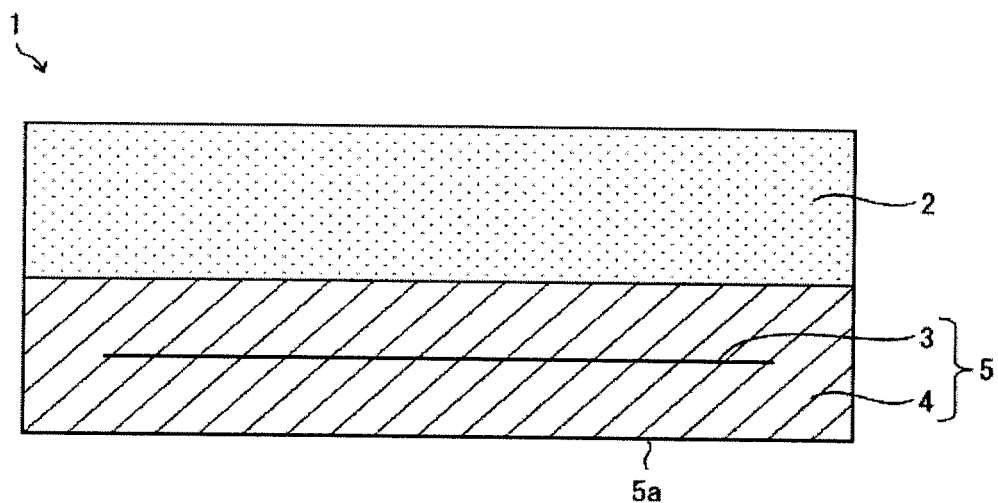
FIG. 1 is an external lateral view illustrating a foamed composite molded product in accordance with one or more embodiments of the present invention.

FIG. 1 is an external lateral view illustrating a foamed composite molded product used in one or more embodiments.

As illustrated in FIG. 1, a foamed composite molded product 1 is a molded product into which polyurethane foam 2 and an in-mold foamed molded product unit 5 are integrally molded. The in-mold foamed molded product unit 5 includes an insert material 3 and an in-mold foamed molded product constituted by thermoplastic resin expanded particles. In the example illustrated in FIG. 1, an in-mold foamed molded product 4, constituted by polyolefin-based resin expanded particles, is molded integrally with the insert material 3.

In a case where, for example, the foamed composite molded product 1 is to be mounted to a vehicle, the polyurethane foam 2 may be (i) provided to at least a surface of the in-mold foamed molded product 4 which surface is on a side opposite a vehicle-mounting side of the in-mold foamed molded product 4 but (ii) not provided to a surface on the vehicle-mounting side.

The insert material 3 is provided inside the in-mold foamed molded product 4. The insert material 3 may be made of any of a variety of materials, provided that the insert material 3 is stronger against breakage (i.e., has a higher tensile strength) than the in-mold foamed molded product 4. In other words, the insert material 3 may be made of any of a variety of materials provided that the insert material 3 is harder than the in-mold foamed molded product 4, or, if the material of the insert material 3 is softer than the in-mold foamed molded product 4, provided that the insert material 3 is less easily broken than the in-mold foamed molded product 4. The insert material 3 may be made of a material having high affinity with the polyurethane foam 2. Examples of materials for the insert material 3 include metal, inorganic fiber (carbon fiber, glass fiber, and the like), fiber reinforced plastic (carbon fiber reinforced plastic, glass fiber reinforced plastic, and the like), fiber reinforced metal, wood, and concrete. Out of these examples, metal wire may be used as the material of the insert material 3. Examples of metals which can be used for the insert material 3 include iron, stainless steel, zinc, and aluminum.

Examples of a base material resin for constituting the expanded particles include, but are not particularly limited to, polyolefin resin, polystyrene resin, styrene-modified polyolefin resin (olefin-modified polystyrene resin), and polyester resin. Out of these examples for the thermoplastic resin expanded particles, an olefin resin such as polyolefin resin or styrene-modified polyolefin resin may be used. In one or more embodiments of the present invention a polyolefin resin may be used. This is because the use of these resins provides a superior shock-absorbing property, chemical resistance, heat resistance, and strain recovery rate after compression, and allows for easy recycling.

Examples of the polyolefin resin include, but are not particularly limited to, polypropylene resin and polyethylene resin. Examples of the polypropylene resin include a propylene homopolymer, an ethylene/propylene copolymer, and an ethylene/propylene/1-butene copolymer. Examples of the polyethylene resin include an ethylene homopolymer, high density polyethylene resin, medium density polyethylene resin, low density polyethylene resin, and linear low-density polyethylene resin. More specific examples include ethylene/1-butene copolymer and ethylene/4-methyl-1-pentene copolymer. Note that the copolymers can each be a random copolymer or a block copolymer.

A method of producing the expanded particles is not limited to any particular one, and can be a conventionally known production method. For example, in a case where the expanded particles to be produced are polyolefin-based resin expanded particles, examples of the production method include the methods disclosed in International Patent Application Publication No. WO 2009/075208, Japanese Patent Application Publication, Tokukai, No. 2006-117842, and the like. In a case where the expanded particles to be produced are polystyrene-based resin expanded particles, examples of the production method include the methods disclosed in Japanese Patent Application Publication, Tokukai, No. 2003-201360, Japanese Patent Application Publication, Tokukai, No. 2014-118474, International Patent Application Publication No. WO 2015/137363, and the like (in these patent literature, the expanded particles are disclosed as "pre-expanded particles"). In a case where the expanded particles to be produced are styrene-modified polyolefin-based resin expanded particles, examples of the production method include the methods disclosed in Japanese Patent Application Publication, Tokukai, No. 2008-239794, International Patent Application Publication No. WO 2016/152243, and the like. Note, however, that the method of producing the expanded particles is not limited to the above methods.

The expanded particles thus obtained can contain or be coated with an additive as needed by a conventionally known method, examples of which additive include a flame retarder, an antistatic agent, and a coloring agent. A particle size of the expanded particles is not particularly limited, and can be, for example, 1 mm to 10 mm. From the viewpoint of the ease with which to fill an in-mold foam molding mold with the expanded particles, the particle size may be between 1 mm to 5 mm in one or more embodiments of the present invention, and between 1 mm to 3 mm in another embodiment.

An expansion ratio of the expanded particles is not particularly limited, and can be, for example, 3 times to 90 times. From the viewpoint of mechanical strength and moldability, the expansion ratio may be 5 times to 60 times in one or more embodiments of the present invention and in another embodiment may be 5 times to 45 times.

Such expanded particles are sold under trade names such as EPERAN-PP and EPERAN-XL (both of which are available from Kaneka Corporation) and are easily available.

In one or more embodiments of the present invention, for convenience, the in-mold foamed molded product 4 is hereinafter described as an in-mold foamed molded product made of polyolefin-based resin expanded particles. The in-mold foamed molded product 4 is molded by heating polyolefin-based resin expanded particles with use of a mold apparatus for in-mold foam molding so that the polyolefin-based resin expanded particles are expanded and fused. The details will be described below.

The mold apparatus for in-mold foam molding includes (i) a concave unit having a concave mold and a concave housing which holds the concave mold and (ii) a convex unit having a convex mold and a convex housing which holds the convex mold. The concave mold and the convex mold form a space when closed together. The space is filled with polyolefin-based resin expanded particles. The expanded particles can have an inorganic gas or the like impregnated therein in advance so as to increase internal pressure, or can be particles which are at atmospheric pressure and not internally pressurized. After the space is filled with the polyolefin-based resin expanded particles, saturated steam pressure of approximately 0.04 MPa(G) to 0.40 MPa(G) is supplied into each of chambers, which are respectively provided in the concave housing and in the convex housing, to heat the polyolefin-based resin expanded particles so that the polyolefin-based resin expanded particles are expanded and fused. In this way, the in-mold foamed molded product 4 is obtained by in-mold foam molding of the polyolefin-based resin expanded particles.

The in-mold foamed molded product unit 5 is obtained by providing the insert material 3 to the convex mold or the concave mold of the mold apparatus for the in-mold foamed molded product and carrying out the above technique for in-mold foam molding, such that the in-mold foamed molded product 4 is molded integrally with the insert material 3. The in-mold foamed molded product unit 5 can be used as, for example, a core material for a vehicle seat. In such a case, the foamed composite molded product 1 is used for a vehicle seat of, for example, an automobile in such a manner that (i) an exposed surface 5a of the foamed composite molded product 1 where the in-mold foamed molded product unit 5 is exposed (i.e., a contact surface which was in contact with the foamed composite molding mold) is attached to a vehicle body and (ii) the other surface where the polyurethane foam 2 is molded is covered with a seat cover.

Figure 2:
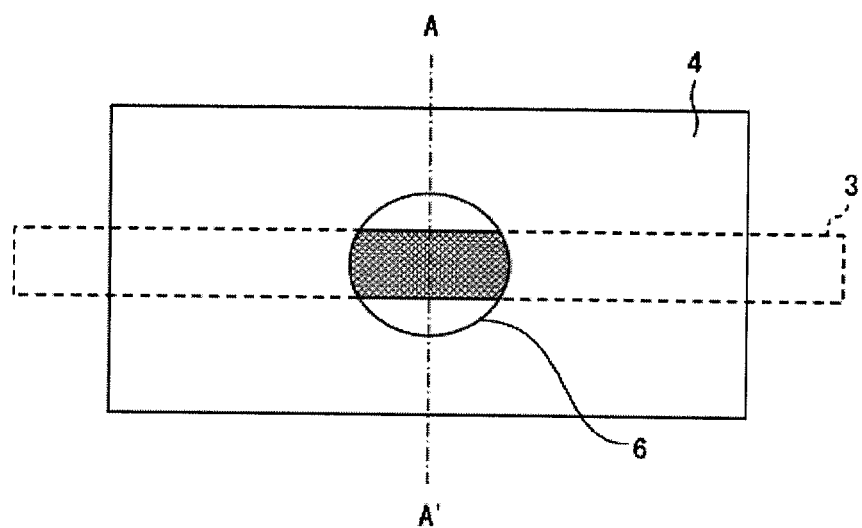
FIG. 2 is a plan view illustrating a structure of an in-mold foamed molded product unit in accordance with one or more embodiments of the present invention.

FIG. 2 is a plan view illustrating a structure of an in-mold foamed molded product unit in accordance with one or more embodiments of the present invention. FIG. 2 illustrates a structure in which an insert material is exposed through an opening (or hole) made in the in-mold foamed molded product. FIG. 2 is a plan view viewed from an exposed surface 5a-side.

As illustrated in FIG. 2, an opening 6 is made in the exposed surface 5a of the in-mold foamed molded product 4. A part of the insert material 3 is exposed through the opening 6. The part of the insert material 3, which part is exposed through the opening 6, comes into contact with a fixing part provided in a foamed composite molding mold described later. This allows the position of the in-mold foamed molded product 4 to be fixed in the foamed composite molding mold during molding.

According to a conventional method of producing the foamed composite molded product 1, a gap is formed between (i) exposed surface 5a of the in-mold foamed molded product unit 5 and (ii) a foamed composite molding mold. This unfortunately molds the polyurethane foam 2 while the polyurethane foam 2 comes around to the exposed surface 5a. One or more embodiments of the present invention relate to easily restricting the polyurethane foam 2 from coming around to the exposed surface 5a of the in-mold foamed molded product unit 5 during molding of the foamed composite molded product 1. As a result of diligent study with this in view, the inventors of one or more embodiments of the present invention deemed that it would be possible to easily restrict a polyurethane foam 2 from coming around to an exposed surface 5a by fixing, in a foamed composite molding mold, an insert material 3 that is exposed at an exposed surface 5a of an in-mold foamed molded product unit 5, which exposed surface 5a is a contact surface that comes into contact with the mold. The following production method was thus completed.

The method of producing (molding) the foamed composite molded product 1 in accordance with one or more embodiments of the present invention includes the step of: (a) fixing an exposed part of the insert material 3 with use of the fixing part which is provided in the foamed composite molding mold so as to correspond to an exposed part of the insert material 3, the insert material 3 being provided at an exposed surface 5a (contact surface in contact with the foamed composite molding mold) of the in-mold foamed molded product unit 5; and (b) introducing a polyurethane liquid into the mold. A method of molding the foamed composite molded product 1 will be described in detail below.

<Method of Molding Foamed Composite Molded Product 1>

Figure 3A:
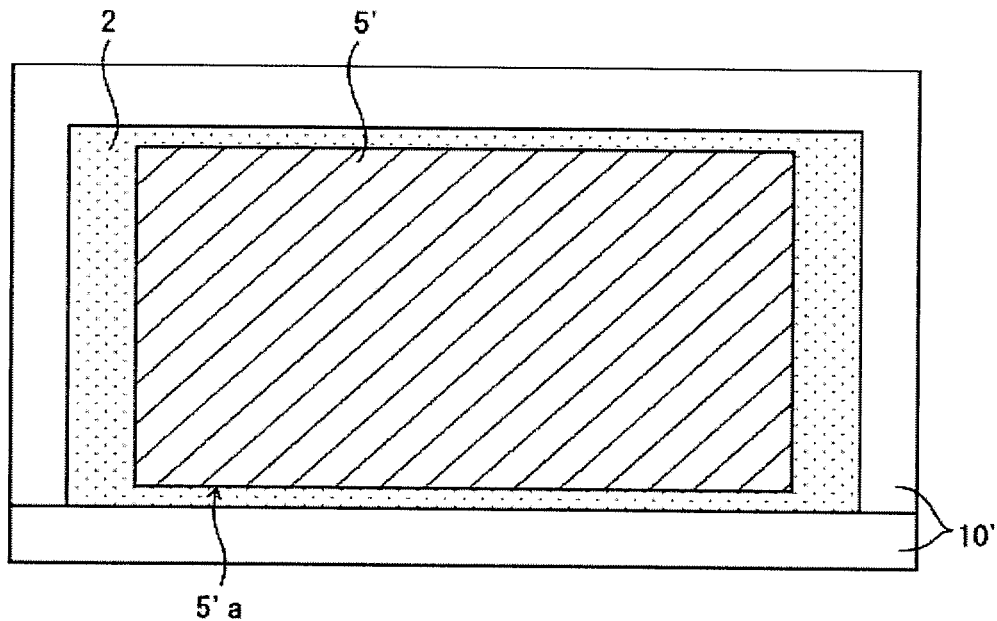
FIG. 3(A) is a cross-sectional view illustrating a method of producing a conventional foamed composite molded product.

The method of molding (producing) the foamed composite molded product 1 will be described below with reference to FIG. 3. FIG. 3(A) is a cross-sectional view illustrating a method of molding a conventional foamed composite molded product, and FIG. 3(B) is a cross-sectional view illustrating a method of molding the foamed composite molded product 1 in accordance with one or more embodiments of the present invention.

Figure 3B:
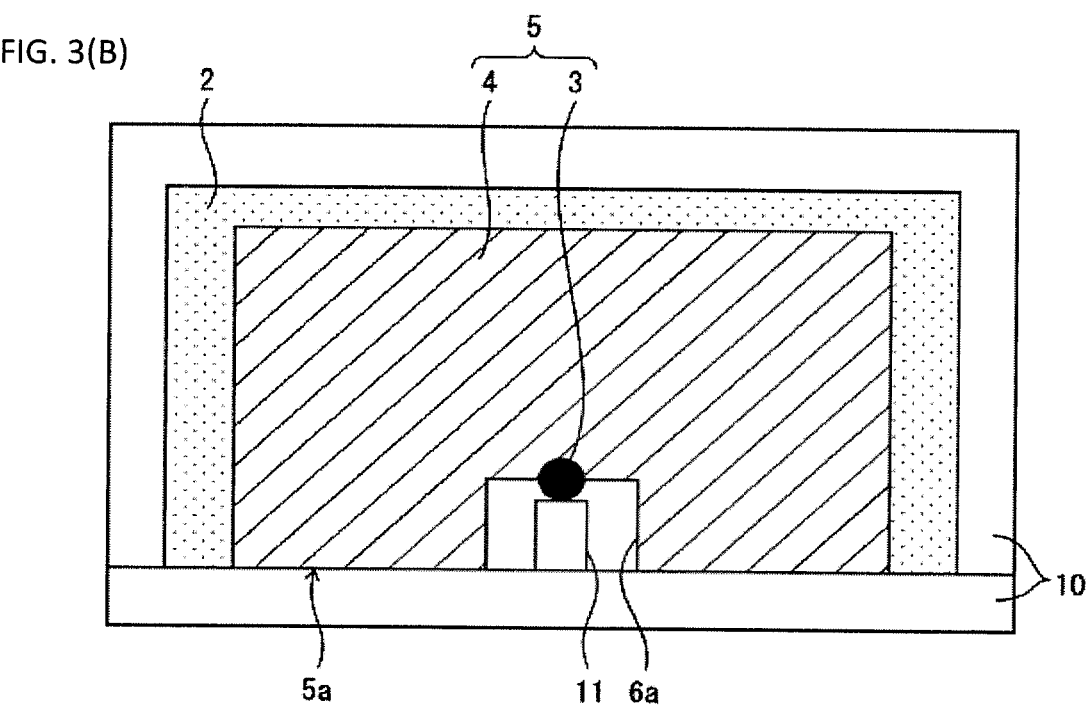
FIG. 3(B) is a cross-sectional view illustrating a method of molding a foamed composite molded product in accordance with one or more embodiments of the present invention.

The in-mold foamed molded product unit 5 illustrated in FIG. 3(B) has a blind hole 6a which serves as an opening 6 (see FIG. 2) which is made in the in-mold foamed molded product 4. When the in-mold foamed molded product unit 5 is placed in a foamed composite molding mold 10, at least part of the insert material 3 is exposed through the in-mold foamed molded product 4 at least on a side of the in-mold foamed molded product unit 5, on which side the in-mold foamed molded product 4 is in contact with the mold 10. The part of the insert material 3 is fitted into a bottom of the blind hole 6a. That is, the insert material 3 located at the blind hole 6a is exposed through the in-mold foamed molded product 4.

As illustrated in FIGS. 3(A) and 3(B), in the method of producing the foamed composite molded product 1, first, the in-mold foamed molded product unit 5 is placed in the foamed composite molding mold 10 in order to integrally mold the in-mold foamed molded product unit 5 with the polyurethane foam 2. In so doing, a polyurethane liquid, which serves as a raw material for the polyurethane foam 2, is introduced into the foamed composite molding mold 10 (introducing step). Then, the polyurethane liquid is heated to 70° C. to 150° C. to foam the polyurethane liquid so that the polyurethane foam 2 is molded. This results in the foamed composite molded product 1 in which the polyurethane foam 2 and the in-mold foamed molded product unit 5 are integrally molded.

It should be noted that some sinks or warps will unfortunately occur on an in-mold foamed molded product unit 5 produced by in-mold foam molding of expanded particles of olefin resin with an insert material 3. Therefore, as illustrated in FIG. 3(A), when a conventional in-mold foamed molded product unit 5' is placed in a foamed composite molding mold 10', a gap occurs between (i) an exposed surface 5'a of the in-mold foamed molded product unit 5' and (ii) a mold 10', so that a polyurethane liquid and a polyurethane foam 2 enter the gap. This causes the polyurethane foam 2 to be molded between the exposed surface 5'a and the mold 10'.

In contrast, the method of producing (molding) the foamed composite molded product 1 in accordance with one or more embodiments of the present invention includes a fixing step in which an exposed part of the insert material 3 of the in-mold foamed molded product unit 5 is fixed by a fixing part provided in the mold 10. The fixing part corresponds to the exposed part of the insert material 3.

Specifically, as illustrated in FIG. 3(B), a magnetic body 11 serving as the fixing part is provided in the mold 10. A magnet is suitable as the magnetic body 11, but the magnetic body 11 can be an electromagnet. Examples of a material for the magnet include, but are not particularly limited to, neodymium and samarium cobalt. A material for the insert material 3 in accordance with one or more embodiments of the present invention is, among metal wires, iron that is attached to the magnetic body 11. The magnetic body 11 is provided so that when the in-mold foamed molded product unit 5 is placed in the mold 10, the magnetic body 11 faces the insert material 3 which is exposed at the bottom surface of the blind hole 6a of the exposed surface 5a. In a case where the in-mold foamed molded product unit 5 is placed in the mold 10, the insert material 3, which is exposed at the bottom surface of the blind hole 6a, comes into contact with the magnetic body 11.

Therefore, in a case where the in-mold foamed molded product unit 5 is placed in the foamed composite molding mold 10, the exposed part of the insert material 3 is magnetically attached (magnetically adhering) to the magnetic body 11 (fixing step). In the method of producing the foamed composite molded product 1 in accordance with one or more embodiments of the present invention, the introducing step is carried out so that a polyurethane liquid is introduced into the mold 10 while the exposed part of the insert material 3 of the in-mold foamed molded product unit 5 is fixed. In the introducing step, the exposed surface 5a of the in-mold foamed molded product unit 5 remains in contact with the mold 10 due to the magnetic attachment between the insert material 3 and the magnetic body 11. This makes it possible to prevent the polyurethane liquid and the polyurethane foam 2 from entering a gap between the exposed surface 5a and the mold 10. As a result, it is possible to prevent the polyurethane foam 2 from being molded between the exposed surface 5a and the mold 10.

According to one or more embodiments of the present invention, the exposed part of the insert material 3 at the exposed surface 5a of the in-mold foamed molded product unit 5 is provided at a position where a gap between the mold 10 and the exposed surface 5a is expected to be large. This makes it possible to efficiently restrict the polyurethane liquid and the polyurethane foam 2 from entering the gap between the exposed surface 5a and the mold 10.

It should be noted that in a case where the polyurethane liquid is introduced into the mold 10' after the in-mold foamed molded product unit 5' is placed in the mold 10' as in the method of producing the conventional foamed composite molded product illustrated in FIG. 3(A), the position of the in-mold foamed molded product unit 5' is unfortunately shifted in the mold 10' due to a pressure of the polyurethane liquid being introduced.

In contrast, according to the method of producing the foamed composite molded product 1 in accordance with one or more embodiments of the present invention illustrated in FIG. 3(B), the position of the in-mold foamed molded product unit 5 after it is placed in the mold 10 is fixed due to the magnetic attachment between the exposed part of the insert material 3 and the magnetic body 11. It is therefore possible to mold the foamed composite molded product 1 while the position of the in-mold foamed molded product unit 5 is restricted from being shifted in the mold 10. Hence, with the method of producing the foamed composite molded product 1 in accordance with one or more embodiments of the present invention, it is possible to produce a foamed composite molded product 1 with more precise dimensions.

A plurality of exposed parts of the insert material 3 are provided at the exposed surface 5a of the in-mold foamed molded product 4. This makes it possible to efficiently restrict the polyurethane liquid and the polyurethane foam 2 from entering the gap between (i) the exposed surface 5a of the in-mold foamed molded product unit 5 and (ii) the mold 10. In a case where there is one location at which a gap between the mold 10 and the exposed surface 5a is expected to be large, the plurality of exposed parts of the insert material 3 can be intensively provided at the one location. In a case where there are a plurality of locations at which gaps between the mold 10 and the exposed surface 5a are expected to be large, the plurality of exposed parts can be distributed so as to correspond to the plurality of locations.

In addition, according to the configuration illustrated in FIG. 3(B), only a lower end part of the insert material 3 is magnetically attached to the magnetic body 11. However, the configuration of the magnetic body 11 is not particularly limited, provided that the position of the insert material 3 can be fixed to the magnetic body 11 by magnetic attachment. For example, in terms of shape, the magnetic body 11 can have an engagement recess by which to engage with the insert material 3. In such a case, the engagement recess can be constituted by a plurality of magnetic bodies 11 put together.

In addition, the application of the molding method in accordance with one or more embodiments of the present invention is not limited to the in-mold foamed molded product unit 5 in which, as illustrated in FIG. 3(B), at least part of the insert material 3 is exposed to the outside of the in-mold foamed molded product 4. Alternatively, the molding method can be applied to an in-mold foamed molded product unit in which an insert material 3 is exposed to the outside of an in-mold foamed molded product, from an upper end to a lower end of the insert material 3.

[Structural Characteristics of Foamed Composite Molded Product 1]

Figure 4A:
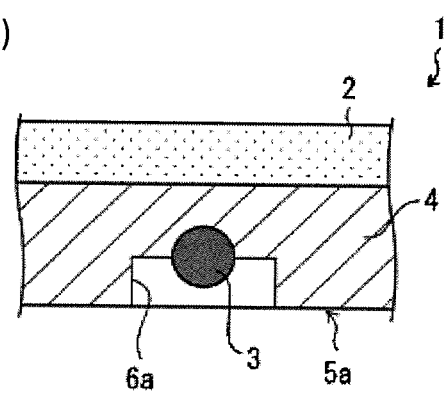
FIG. 4(A) is a cross-sectional view illustrating (i) structural characteristics of a foamed composite molded product produced by the production method in accordance with one or more embodiments of the present invention and (ii) a configuration in the vicinity of a blind hole.

Structural characteristics of the foamed composite molded product 1, which is produced by the production method described above, will be described below with reference to FIG. 4(A). FIG. 4(A) is a cross-sectional view illustrating (i) the structural characteristics of the foamed composite molded product 1 produced by the production method in accordance with one or more embodiments of the present invention and (ii) a configuration in the vicinity of the blind hole 6a.

As illustrated in FIG. 4(A), the foamed composite molded product 1 has the exposed surface 5a at which the in-mold foamed molded product 4 is exposed. On a side on which the exposed surface 5a is located, at least part of the insert material 3 is exposed to the outside. Specifically, the insert material 3 is exposed at the bottom surface of the blind hole 6a. In addition, the polyurethane foam 2 is provided on a surface of the in-mold foamed molded product 4, which surface is opposite the surface on which the exposed surface 5a is located.

According to the production method in accordance with one or more embodiments of the present invention, the insert material 3, which is exposed at the bottom surface of the blind hole 6a, is magnetically attached to the magnetic body of the mold during the introducing step. Therefore, even in a case when the polyurethane foam 2 has been molded, the insert material 3, which is exposed at the bottom surface of the blind hole 6a, remains exposed.

Figure 4B:
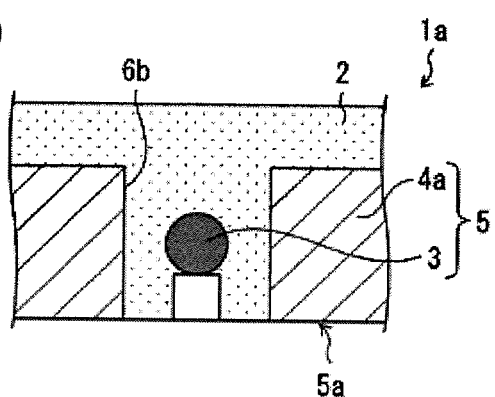
FIG. 4(B) is a cross-sectional view illustrating a configuration of a variation of the foamed composite molded product in accordance with one or more embodiments of the present invention.

FIG. 4(B) is a cross-sectional view illustrating a configuration of a variation of the foamed composite molded product in accordance with one or more embodiments of the present invention. As illustrated in FIG. 4(B), the foamed composite molded product 1a, which is a variation of the foamed composite molded product 1, differs from the foamed composite molded product 1 in that an in-mold foamed molded product 4a has a through hole 6b which serves as an opening.

An in-mold foamed molded product unit 5, which serves as a core material of the foamed composite molded product 1a, is configured so that an insert material 3 is exposed, at the through hole 6b, to the outside of the in-mold foamed molded product 4a. The through hole 6b passes through the in-mold foamed molded product 4a. The insert material 3 is exposed to the outside of the in-mold foamed molded product 4a, from an upper end to a lower end of the insert material 3. The foamed composite molded product 1a is molded by the production method described above with use of such an in-mold foamed molded product unit 5 serving as a core material.

As illustrated in FIG. 4(B), the foamed composite molded product 1a is configured so that the insert material 3, which is exposed at the through hole 6b from the upper end to the lower end of the insert material 3, has (i) an upper part which is in contact with the polyurethane foam 2 and (ii) a lower part which is located on the exposed surface 5a side and is exposed to the outside. The insert material 3 is made of a material, such as metal, which has high affinity with the polyurethane foam 2. Therefore, since the upper part of the insert material 3, which upper part is exposed at the through hole 6b, is in contact with the polyurethane foam 2, it is possible to increase an adhesion strength by which the polyurethane foam 2 and the in-mold foamed molded product unit 5 adhere to each other.

Examples of the shape of the magnetic body 11 include, but are not particularly limited to, a columnar shape, a cylindrical shape, a prism shape, a rectangular tubular shape, and a spherical shape. From the viewpoint of the ease with which to place the magnetic body 11 in the mold 10, the shape may be a cylindrical shape or a rectangular tubular shape.

There is no particular limitation to the size of the magnetic body 11. For general versatility, a diameter of the magnetic body 11 may not be less than 1.0 mm and not more than 35.0 mm in one or more embodiments of the present invention, and in another embodiment may not be less than 5.0 mm and not more than 25.0 mm, and yet in another embodiment may not be less than 8.0 mm and not more than 20.0 mm. There is no upper limit of the size of the blind hole 6a or of the through hole 6b, because a larger size of the in-mold foamed molded product 4 allows for a larger size of each of the blind hole 6a and the through hole 6b. However, from the viewpoint of the ease with which to provide the blind hole 6a or the through hole 6b in the foamed composite molding mold, the size of each of the blind hole 6a and the through hole 6b may be slightly larger than that of the magnetic body 11. For example, for general versatility, a diameter of each of the blind hole 6a and the through hole 6b may not be less than 1.5 mm and not more than 40.0 mm in one or more embodiments of the present invention, and in another embodiment may not be less than 5.5 mm and not more than 30.0 mm, and in yet another embodiment may not be less than 8.5 mm and not more than 25.0 mm. In a case where the shape of any of the magnetic body 11, the blind hole 6a, and the through hole 6b does not allow for description in terms of diameter, the diameter is considered to be a dimension at which distance is greatest along an unobstructed straight line between two points on the perimeter of the hole.

The following description will discuss another embodiment of the present invention. For convenience, members which are identical in function to the members described in above are given respective identical reference signs, and descriptions of those members are omitted.

Figure 5A:
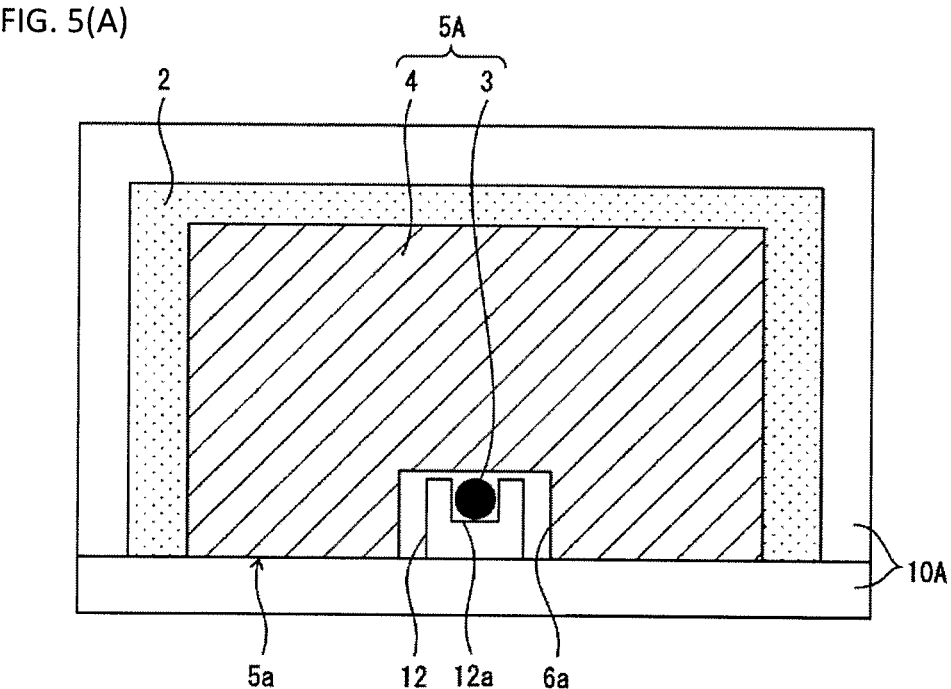
FIG. 5(A) is a cross-sectional view illustrating a foamed composite molded product production method in accordance with one or more embodiments of the present invention.
Figure 6:
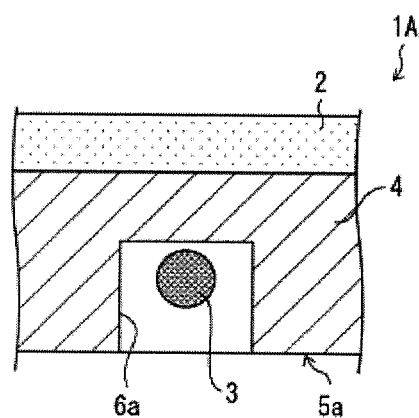
FIG. 6 is a cross-sectional view illustrating structural characteristics of a foamed composite molded product produced by a production method in accordance with one or more embodiments of the present invention.

FIG. 5(A) is a cross-sectional view illustrating a foamed composite molded product molding method in accordance with one or more embodiments of the present invention. FIG. 6 is a cross-sectional view illustrating structural characteristics of a foamed composite molded product 1A produced by the method illustrated in FIG. 5(A).

As illustrated in FIG. 5(A), a mold 10A, which is used in the foamed composite molded product molding method in accordance with one or more embodiments of the present invention, includes a position fixing part 12. The position fixing part 12 has an engagement recess (engagement part) 12a which is to be engaged with an insert material 3 exposed at an exposed surface 5a of an in-mold foamed molded product unit 5A.

According to the in-mold foamed molded product unit 5A, the insert material 3 is distanced from a bottom surface of a blind hole 6a. The insert material 3 is exposed to the outside of the in-mold foamed molded product 4, from an upper end to a lower end of the insert material 3.

According to the molding method illustrated in FIG. 5(A), in a case where the in-mold foamed molded product unit 5A is placed in the foamed composite molding mold 10A, an exposed part of the insert material 3 is engaged with the engagement recess 12a. This causes the exposed part to be fixed by the engagement recess 12a (fixing step). According to one or more embodiments of the present invention, an introducing step is carried out so that a polyurethane liquid is introduced into the mold 10A while the exposed part of the insert material 3 of the in-mold foamed molded product unit 5A is engaged with the engagement recess 12a. In the introducing step, the exposed surface 5a of the in-mold foamed molded product unit 5A remains in contact with the mold 10A due to the engagement between the insert material 3 and the engagement recess 12a. This makes it possible to prevent the polyurethane liquid and a polyurethane foam 2 from entering a gap between the exposed surface 5a and the mold 10A. As a result, it is possible to prevent the polyurethane foam 2 from being molded between the exposed surface 5a and the mold 10A.

As illustrated in FIG. 6, the foamed composite molded product 1A, which is produced by the molding method illustrated in FIG. 5(A), has the exposed surface 5a at which an in-mold foamed molded product 4 is exposed. The insert material 3 is exposed to the outside on a side on which the exposed surface 5a is located. More specifically, the insert material 3 is exposed while being distanced from the bottom surface of the blind hole 6a which is made at the exposed surface 5a. In addition, the polyurethane foam 2 is provided on a surface of the in-mold foamed molded product 4, which surface is opposite the surface on which the exposed surface 5a is located.

It should be noted that the engagement recess 12a illustrated in FIG. 5(A) is configured so that the upper end and the lower end are set to be equal in terms of width. This causes the width, by which the engagement recess 12a is opened, to be constant from the bottom surface of the lower end through an opening part of the upper end. However, the width of the engagement recess 12a in accordance with one or more embodiments of the present invention is not particularly limited, provided that the engagement recess 12a can be engaged with the exposed part of the insert material 3.

Figure 5B:
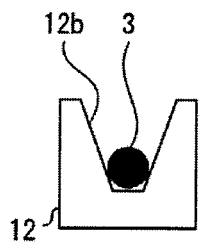
FIGS. 5(B) through 5(E) are cross-sectional views schematically illustrating respective configurations of variations of a position fixing part illustrated in FIG. 5(A).
Figure 5C:
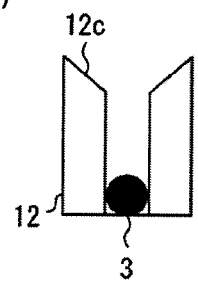
Figure 5D:
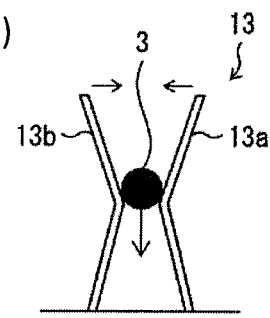

FIGS. 5(B) through 5(D) are cross-sectional views schematically illustrating configurations of variations of the position fixing part 12. For example, the engagement recess 12a can be shaped so that a bottom surface of the lower end can be narrower in width than an opening part of the upper end. For example, as in the case of the variation illustrated in FIG. 5(B), the engagement recess 12b can have a tapering U shape which is opened such that the width of the opening at the upper end becomes gradually narrower toward the bottom surface of the lower end. Alternatively, as in the case of the variation illustrated in FIG. 5(C), for example, the engagement recess 12c can have a Y shape which is opened such that (i) a wall surface is tapering from the upper end part, (ii) the width of the wall surface becomes constant at a certain point, and (iii) the wall surface continues extending toward the lower end part while retaining the constant width.

Figure 5E:
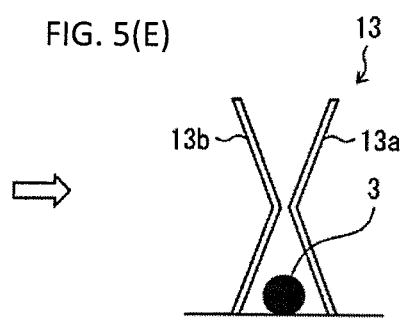

The position fixing part is not limited to a configuration in which the engagement recess is included, provided that the insert material 3 can be fixed. For example, as illustrated in FIG. 5(D), the position fixing part can include two flat springs 13a and 13b. The flat springs 13a and 13b have respective forces which pressure the flat springs 13a and 13b to move closer to each other. Before the position fixing of the in-mold foamed molded product unit, the insert material 3 is sandwiched between the flat springs 13a and 13b. In this state, the flat springs 13a and 13b are locked by the insert material 3 despite the forces. In a case where the insert material 3 in this state is moved downwards so that the insert material 3 is no longer sandwiched between the flat springs 13a and 13b, the flat springs 13a and 13b are moved closer to each other due to the forces. As a result, the distance between the flat springs 13a and 13b becomes smaller than the diameter of the insert material 3. This prevents the insert material 3 from moving upwards, and therefore causes the position of the insert material 3 to be fixed (see "AFTER POSITION IS FIXED" in FIG. 5(E)).

Alternatively, a magnetic body, which is to be magnetically attached to the insert material 3, can be provided to at least a part of each of engagement recesses 12a through 12c, which part is to come into contact with the insert material 3.

In addition, the application of the molding method in accordance with one or more embodiments of the present invention is not limited to the in-mold foamed molded product unit 5A in which, as illustrated in FIG. 5(A), the insert material 3 is exposed to the outside of the in-mold foamed molded product 4 from the upper end through the lower end of the insert material 3. Alternatively, the molding method can be applied to an in-mold foamed molded product unit in which at least part of an insert material is exposed to the outside of an in-mold foamed molded product.

Figure 7A:
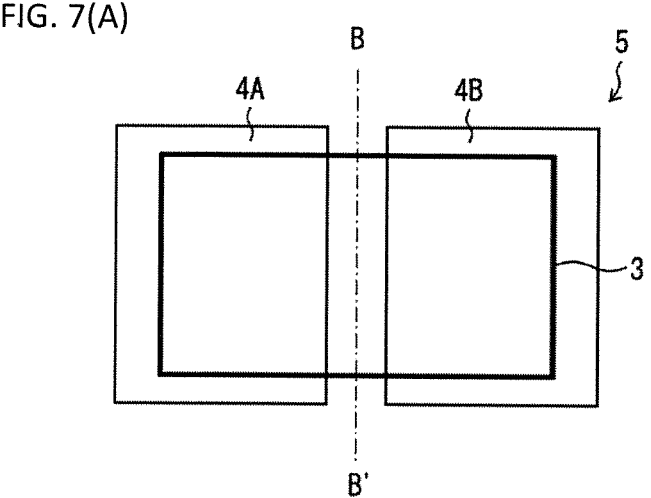
FIGS. 7(A) and 7(B) are plan views illustrating respective configurations of in-mold foamed molded product units which are used in one or more embodiments of the present invention.
Figure 7B:
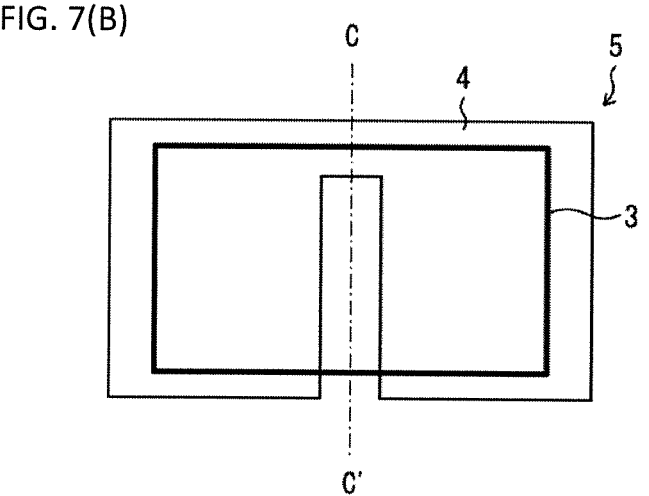

The following description will discuss another embodiment of the present invention. For convenience, members which are identical in function to the members described in the previous embodiments are given respective identical reference signs, and descriptions of those members are omitted. FIGS. 7(A) and 7(B) are plan views illustrating respective configurations of in-mold foamed molded product units 5 which are used in one or more embodiments of the present invention.

According to the in-mold foamed molded product unit 5 illustrated in FIG. 7(A), an in-mold foamed molded product 4 is divided into two molded body pieces 4A and 4B. An insert material 3 is in the form of a loop embedded so as to be in both of the molded body pieces 4A and 4B. The insert material 3 is thus exposed to the outside of the in-mold foamed molded product 4 at a gap between two of a plurality of molded body pieces which are obtained by dividing the in-mold foamed molded product 4. In this state, the insert material 3 is exposed to the outside of the in-mold foamed molded product 4 at two positions. Alternatively, the in-mold foamed molded product 4 can be divided into three or more parts. That is, three or more molded body pieces can be provided by dividing the in-mold foamed molded product 4.

The in-mold foamed molded product unit 5 illustrated in FIG. 7(B) is configured so that part of the in-mold foamed molded product 4 is cut out so as to form a groove which transects one of two opposing sides of a quadrangle corresponding to an outline of the insert material 3. According to this configuration, the insert material 3 is exposed to the outside of the in-mold foamed molded product 4 at only one position. Alternatively, the in-mold foamed molded product 4 can have a groove such as that described above at two or more positions.

In the configuration where the in-mold foamed molded product 4 is divided, a distance by which the molded body piece 4A and the molded body piece 4B are separated is hereinafter also described as a "division width". The term "division width" is also used to describe the width of the groove formed in the in-mold foamed molded product 4 by cutting out part of the in-mold foamed molded product 4. In a case where the distance by which the molded body pieces 4A and 4B are separated is not uniform, or in a case where the width of the groove is not uniform, the term "division width" refers to a dimension equivalent to the greatest distance of width. Depending on the shape of the foamed composite molded product, an excessively large division width brings about the risk of a reduction in the cushioning property or strength of the foamed composite molded product. As such, the division width is adjusted as necessary. A larger size of the in-mold foamed molded product 4 enables a larger division width. As such, there is no upper limit to the division width. However, for general versatility, the division width is, for example, not less than 1.0 mm and not more than 150.0 mm in one or more embodiments of the present invention, and in another embodiment may not be less than 5.0 mm and not more than 30.0 mm, and in yet another embodiment may not be less than 5.0 mm and not more than 15.0 mm.

Figure 8:
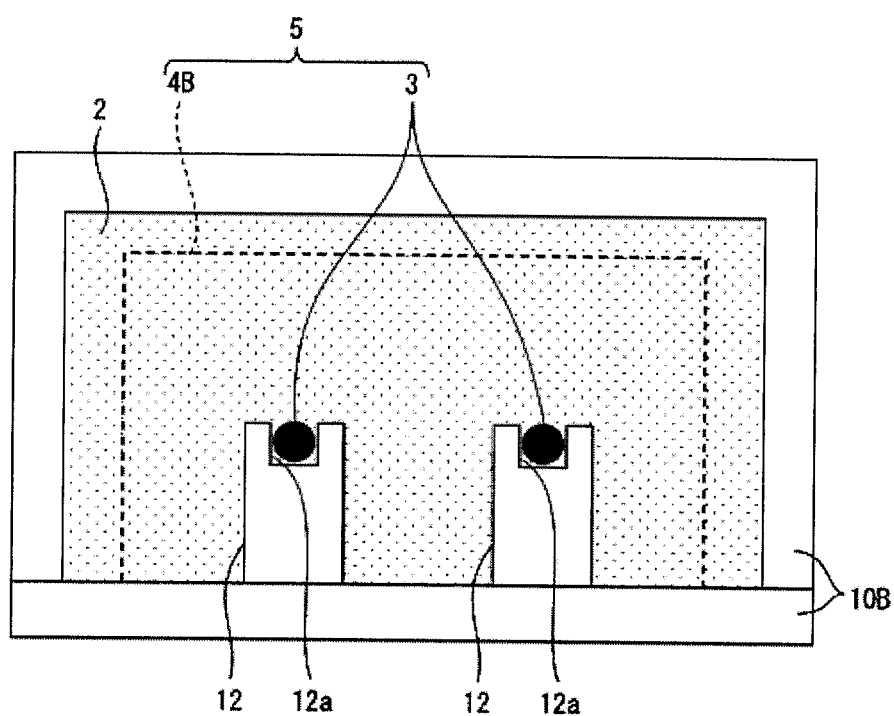
FIG. 8 is a cross-sectional view illustrating a method of producing a foamed composite molded product in which the in-mold foamed molded product unit illustrated in FIG. 7(A) serves as a core material.

FIG. 8 is a cross-sectional view illustrating a method of molding a foamed composite molded product in which the in-mold foamed molded product unit 5 illustrated in FIG. 7(A) serves as a core material. Note that FIG. 8 is a cross-sectional view corresponding to a cross section taken along the line B-B' shown in FIG. 7(A).

As illustrated in FIG. 8, a mold 10B, which is used in the foamed composite molded product molding method in accordance with one or more embodiments of the present invention, includes two position fixing parts 12. These two position fixing parts 12 have respective engagement recesses (engagement parts) 12a. The engagement recesses 12a of the two position fixing parts 12 are configured to be each engaged with a corresponding one of two insert materials 3 which are exposed at a gap between the two molded body pieces 4A and 4B of the in-mold foamed molded product unit 5 illustrated in FIG. 7(A).

According to the molding method illustrated in FIG. 8, in a case where the in-mold foamed molded product unit 5 illustrated in FIG. 7(A) is placed in the foamed composite molding mold 10B, the insert materials 3 exposed at the gap between the two molded body pieces 4A and 4B are engaged with the corresponding engagement recesses 12a (fixing step). Because of this engagement, the position of the in-mold foamed molded product unit 5 in the mold 10B is fixed. This causes the exposed surface of the in-mold foamed molded product unit 5 to be in contact with the mold 10B. According to one or more embodiments of the present invention, an introducing step is carried out so that a polyurethane liquid is introduced into the mold 10B while the exposed parts of the insert materials 3 of the in-mold foamed molded product unit 5 are engaged with the corresponding engagement recesses 12a. In the introducing step, the exposed surface of the in-mold foamed molded product unit 5 remains in contact with the mold 10B due to the engagement between the insert materials 3 and the corresponding engagement recesses 12a. This makes it possible to prevent the polyurethane liquid and a polyurethane foam 2 from entering a gap between the exposed surface and the mold 10B. As a result, it is possible to prevent the polyurethane foam 2 from being molded between the exposed surface and the mold 10B.

Figure 9A:
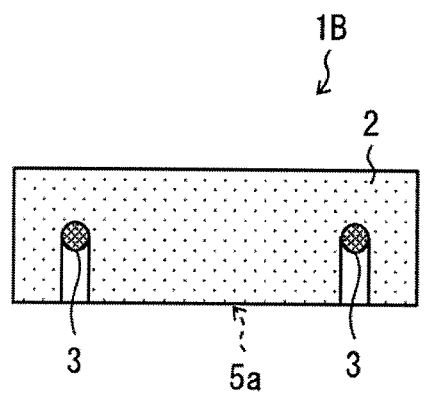
FIG. 9(A) is a cross-sectional view illustrating structural characteristics of a foamed composite molded product produced by a molding method in which the in-mold foamed molded product unit illustrated in FIG. 7(A) serves as a core material.
Figure 9B:
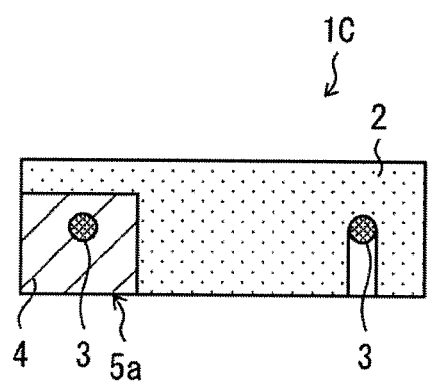
FIG. 9(B) is a cross-sectional view illustrating structural characteristics of a foamed composite molded product produced by a molding method in which the in-mold foamed molded product unit illustrated in FIG. 7(B) serves as a core material.

FIG. 9(A) is a cross-sectional view illustrating structural characteristics of a foamed composite molded product 1B produced by the molding method in which the in-mold foamed molded product unit 5 illustrated in FIG. 7(A) serves as a core material. FIG. 9(B) is a cross-sectional view illustrating structural characteristics of a foamed composite molded product 1C produced by the molding method in which the in-mold foamed molded product unit 5 illustrated in FIG. 7(B) serves as a core material. Note that FIG. 9(A) is a cross-sectional view corresponding to a cross section taken along the line B-B' shown in FIG. 7(A), and FIG. 9(B) is a cross-sectional view corresponding to a cross section taken along the line C-C' shown in FIG. 7(B).

The foamed composite molded product 1B has an exposed surface 5a on a back side of the drawing of FIG. 9(A). The exposed surface 5a illustrated in FIG. 9(A) is a surface at which the molded body piece 4B illustrated in FIG. 7(A) is exposed.

Note that in a case where a polyurethane foam 2 is molded by the mold 10B illustrated in FIG. 8, the polyurethane foam 2 is provided so as to exclude the two position fixing parts 12. Therefore, according to the foamed composite molded product 1B, as illustrated in FIG. 9(A), parts of the polyurethane foam 2, which parts correspond to the position fixing parts 12, are empty and are therefore openings. Then, at these openings, the insert materials 3 are exposed to the outside of the polyurethane foam 2. In other words, (i) upper parts of portions of the insert materials 3, which portions are located on a side opposite the exposed surface 5a side, are in contact with the polyurethane foam 2 and (ii) lower parts of portions of the insert materials 3, which portions are located on the exposed surface 5a side, are exposed to the outside.

As illustrated in FIG. 9(B), the foamed composite molded product 1C has an exposed surface 5a at which an in-mold foamed molded product 4 is exposed. A mold for molding the foamed composite molded product 1C has position fixing parts for fixing the exposed parts of the insert materials 3 of the in-mold foamed molded product unit 5 illustrated in FIG. 7(B). This position fixing parts are configured as with the position fixing parts 12 illustrated in FIG. 8. Therefore, according to the foamed composite molded product 1C, the insert materials 3 are exposed to the outside of the polyurethane foam 2 at the openings corresponding to the position fixing parts.

The foamed composite molded products 1B and 1C are each configured so that at least part of the insert materials 3 are thus exposed to the outside on the exposed surface 5a side of the foamed molded product.

In the method of producing each of the foamed composite molded products (1, 1a, 1A, 1B, 1C) in accordance with one or more embodiments, the exposed part of the insert material 3, although depending on the size of a gap between the foamed composite molding mold (10, 10A, 10B) and the exposed surface 5a, may be provided to an insert material 3 in the vicinity of an outer peripheral part of the in-mold foamed molded product unit (5, 5A), which outer peripheral part faces the foamed composite molding mold (10, 10A, 10B). The exposed part of the insert material 3 may be provided to, for example, at least part of an insert material 3 which is provided in its entirety into the outer peripheral part of the exposed surface 5a of the in-mold foamed molded product unit 5 (see FIG. 10). This makes it possible to efficiently restrict a polyurethane liquid and polyurethane foam 2 from entering from the outer peripheral part of the exposed surface 5a of the in-mold foamed molded product unit 5.

Alternatively, as illustrated in FIGS. 7(A) and 7(B), the exposed part of the insert material 3 can be provided so as to protrude out from the outer peripheral part of the exposed surface of the in-mold foamed molded product unit 5. In such a case, however, the exposed part of the insert material 3 is located so as to be easily attached magnetically to or easily engaged with the fixing part of the foamed composite molding mold (10, 10A, 10B).

Alternatively, in the method of producing each of the foamed composite molded products (1, 1a, 1A, 1B, 1C) in accordance with one or more embodiments, another method for fixing the in-mold foamed molded product unit (5, 5A) to the foamed composite molding mold (10, 10A, 10B) can be employed in combination. Examples of such another method to be employed in combination include a method in which (i) a hook is provided to the insert material 3 of the in-mold foamed molded product unit (5, 5A), which insert material 3 is exposed and (ii) the in-mold foamed molded product unit (5, 5A) is fixed to the foamed composite molding mold (10, 10A, 10B) by engaging the hook with the foamed composite molding mold (10, 10A, 10B). Examples of such another method further include a method in which (i) an opening is provided to the in-mold foamed molded product unit (5, 5A), (ii) an insertion part to be engaged with the opening is provided to the mold (10, 10A, 10B), and (iii) the in-mold foamed molded product unit (5, 5A) is fixed to the foamed composite molding mold (10, 10A, 10B) by engaging the insertion part with the opening.

Embodiments of the present invention are not limited to the embodiments described, but can be altered by a skilled person in the art within the scope of the claims. One or more embodiments of the present invention also encompass, in their technical scope, any embodiments derived by combining technical means disclosed in differing embodiments.

[Recap]

A foamed composite molded product production method in accordance with one or more embodiments of the present invention is a method of producing a foamed composite molded product, the foamed composite molded product including: an in-mold foamed molded product unit; and polyurethane foam, the in-mold foamed molded product unit being (i) obtained by insert molding in which an insert material is provided in an in-mold foamed molded product made of a thermoplastic resin and (ii) configured so that at least part of the insert material is exposed to an outside of the in-mold foamed molded product, and the in-mold foamed molded product unit and the polyurethane foam being integrated, the method including the steps of: (a) fixing, with use of a fixing part provided in a mold, an exposed part of the insert material of the in-mold foamed molded product unit; and (b) introducing a polyurethane liquid into the mold.

According to the configuration, in the step (a), the exposed part of the insert material of the in-mold foamed molded product unit is fixed with use of the fixing part provided in the mold. Then, after the exposed part of the insert material is fixed to the mold with use of the fixing part, a polyurethane liquid is introduced into the mold in the step (b). According to the configuration, the contact surface of the in-mold foamed molded product unit remains in contact with the mold during the step (b), because the exposed part of the insert material is fixed by the fixing part. Therefore, it is possible to prevent a polyurethane liquid from entering a gap between the contact surface and the mold. As a result, it is possible to prevent unnecessary polyurethane foam from being molded between (i) the contact surface of the in-mold foamed molded product unit and (ii) the mold.

With the configuration, it is therefore possible to achieve a method of producing a foamed composite molded product which prevents polyurethane foam from being molded in an unintended part.

In the foamed composite molded product production method in accordance with one or more embodiments of the present invention, the insert material is exposed to the outside of the in-mold foamed molded product by at least one selected from the group consisting of: (1) a blind hole formed in the in-mold foamed molded product; (2) a through hole formed in the in-mold foamed molded product; (3) a gap between two of a plurality of molded body pieces obtained by dividing the in-mold foamed molded product; and (4) a perimeter of an outer surface of the in-mold foamed molded product.

With the configuration, it is possible to easily expose, to the outside of the in-mold foamed molded product, at least part of the insert material which is integrated with the in-mold foamed molded product.

The foamed composite molded product production method in accordance with one or more embodiments of the present invention can be configured so that in the step (a), the fixing part provided in the mold includes a plurality of fixing parts, and the plurality of fixing parts fix respective exposed parts of the insert material.

With the configuration, it is possible to more reliably prevent polyurethane foam from being molded between (i) the contact surface of the in-mold foamed molded product unit and (ii) the mold.

The foamed composite molded product production method in accordance with one or more embodiments of the present invention can be configured so that in the step (a), the exposed part of the insert material is fixed by causing the exposed part to be magnetically attached to a magnetic body of the fixing part.

According to the configuration, the contact surface of the in-mold foamed molded product unit remains in contact with the mold during the step (b), due to the magnetic attachment between the magnetic body and the exposed part of the insert material. Therefore, it is possible to prevent a polyurethane liquid from entering a gap between the contact surface and the mold.

The foamed composite molded product production method in accordance with one or more embodiments of the present invention can be configured so that in the step (a), the exposed part of the insert material is fixed by causing the exposed part to be engaged with an engagement part of the fixing part.

According to the configuration, the contact surface of the in-mold foamed molded product unit remains in contact with the mold during the step (b), due to the engagement between the engagement part and the exposed part of the insert material. Therefore, it is possible to prevent a polyurethane liquid from entering a gap between the contact surface and the mold.

An in-mold foamed molded product unit in accordance with one or more embodiments of the present invention is an in-mold foamed molded product unit obtained by insert molding in which an insert material is provided in an in-mold foamed molded product made of a thermoplastic resin, in a case where the in-mold foamed molded product unit is placed in a mold, at least part of the insert material being exposed to an outside of the in-mold foamed molded product, at least on a side of the in-mold foamed molded product which side is in contact with the mold.

In a case where the in-mold foamed molded product unit thus configured is applied to a foamed composite molded product production method in accordance with one or more embodiments of the present invention, it is possible to prevent unnecessary polyurethane foam from being molded in an unintended part.

A foamed composite molded product in accordance with one or more embodiments of the present invention is a foamed composite molded product including: an in-mold foamed molded product unit; and polyurethane foam, the in-mold foamed molded product unit being obtained by insert molding in which an insert material is provided in an in-mold foamed molded product made of a thermoplastic resin, the foamed composite molded product having an exposed surface at which the in-mold foamed molded product is exposed, and at least part of the insert material being exposed to an outside of the foamed composite molded product on an exposed surface side of the in-mold foamed molded product.

The exposed surface of the foamed composite molded product in accordance with one or more embodiments of the present invention is formed by providing, when the foamed composite molded product is molded, a contact surface of the in-mold foamed molded product unit, which contact surface comes into contact with a mold. According to a foamed composite molded product production method in accordance with one or more embodiments of the present invention, the exposed part of the insert material, which exposed part is provided at the contact surface (exposed surface) of the in-mold foamed molded product unit to come into contact with the mold, is fixed by the fixing part when the foamed composite molded product is molded. Therefore, the foamed composite molded product in accordance with one or more embodiments of the present invention has an exposed surface at which the in-mold foamed molded product is exposed, and at least part of the insert material is exposed to the outside of the foamed composite molded product on an exposed surface side of the in-mold foamed molded product.

With the configuration, it is therefore possible to achieve a foamed composite molded product which prevents unnecessary polyurethane foam from being molded in an unintended part.

A foamed composite molding mold in accordance with one or more embodiments of the present invention is a foamed composite molding mold for producing a foamed composite molded product including an in-mold foamed molded product unit and polyurethane foam, the in-mold foamed molded product unit being (i) obtained by insert molding in which an insert material is provided in an in-mold foamed molded product made of a thermoplastic resin and (ii) configured so that at least part of the insert material is exposed to an outside of the in-mold foamed molded product, and the in-mold foamed molded product unit and the polyurethane foam being integrated in the foamed composite molded product by placing the in-mold foamed molded product unit in the foamed composite molding mold, the mold including: a fixing part which (i) fixes the insert material that is exposed and (ii) is provided so as to face an exposed part of the insert material in a case where the in-mold foamed molded product unit is placed.

With the configuration, it is possible to achieve a foamed composite molding mold which prevents unnecessary polyurethane foam from being molded in an unintended part.

EXAMPLES

Figure 10:
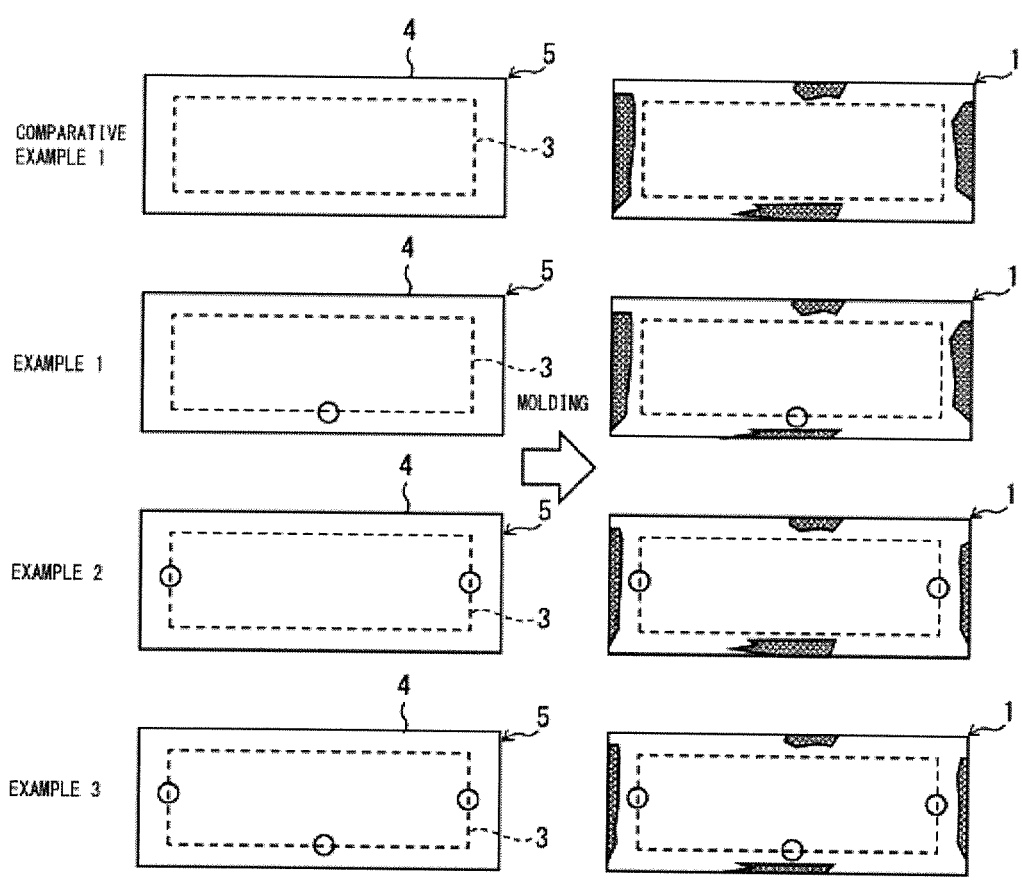
FIG. 10 is a view schematically illustrating methods of producing respective foamed composite molded products in Comparative Example 1 and in Examples 1 through 3.

Foamed composite molded products were prepared in Comparative Example 1 and in Examples 1 through 4 below. FIG. 10 is a view schematically illustrating methods of producing respective foamed composite molded products 1 in Comparative Example 1 and in Examples 1 through 3. Polyolefin-based resin expanded particles were L-EPP36 (manufactured by Kaneka Corporation, ethylene-propylene random copolymer, bulk density of 20 g/L, melting point of 146° C., internal pressure adjusted to approximately 0.1 MPa (G) by impregnating the polyolefin-based resin expanded particles with a pressurized air in a pressure-resistant vessel).

Comparative Example 1

Polyurethane foam 2 was integrally molded without fixing an exposed part of an insert material 3 by use of a magnetic body 11 (neodymium magnet manufactured by Magfine Corporation, countersunk disk, diameter of 20.0 mm). The in-mold foamed molded product unit 5 used as a core material was (i) obtained by insert molding in which the insert material 3 having a rectangular loop shape (made of iron; diameter of 4.5 mm, length of 1200.0 mm, and width of 500.0 mm) was provided in the in-mold foamed molded product 4 (length of 1300.0 mm, width of 600.0 mm, and thickness of 150.0 mm) and (ii) configured so that part of the insert material 3 was exposed at an exposed surface (blind hole; diameter of 22.0 mm).

Example 1

Polyurethane foam 2 was integrally molded while an exposed part of an insert material 3 was fixed at one position by use of a magnetic body 11 (neodymium magnet manufactured by Magfine Corporation, countersunk disk, diameter of 20.0 mm). The in-mold foamed molded product unit 5 used as a core material was (i) obtained by insert molding in which the insert material 3 having a rectangular loop shape (made of iron; diameter of 4.5 mm, length of 1200.0 mm, and width of 500.0 mm) was provided in the in-mold foamed molded product 4 (length of 1300.0 mm, width of 600.0 mm, and thickness of 150.0 mm) and (ii) configured so that part of the insert material 3 was exposed at an exposed surface (blind hole; diameter of 22.0 mm). The circles in FIG. 10 indicate the positions at which the exposed parts of the insert materials 3 were fixed with use of the magnetic bodies 11. As illustrated in FIG. 10, in Example 1, the magnetic body 11 fixes the exposed part of the insert material 3 at one of two long sides of the rectangular loop formed by the insert material 3.

Example 2

A foamed composite molded product 1 was molded as in Example 1 except that the exposed part of the insert material 3 was fixed by the magnetic bodies 11 at two positions. As illustrated in FIG. 10, in Example 2, the magnetic bodies 11 fixes the exposed part of the insert material 3 at both of two short sides of the rectangular loop formed by the insert material 3.

Example 3

A foamed composite molded product 1 was molded as in Example 1 except that the exposed part of the insert material 3 was fixed by the magnetic bodies 11 at three positions. As illustrated in FIG. 10, in Example 2, the magnetic bodies 11 fixes the exposed part of the insert material 3 at (i) both of two short sides of the rectangular loop formed by the insert material 3 and (ii) one of two long sides of the rectangular loop.

Example 4

A foamed composite molded product 1 was molded as in Example 1 except that the exposed part of the insert material 3 was fixed by the magnetic bodies 11 at 10 positions.

The foamed composite molded products 1 of Comparative Example 1 and of Examples 1 through 4 were each evaluated in terms of (i) the degree by which the polyurethane foam 2 comes around to the exposed surface and (ii) the movement of the in-mold foamed molded product unit 5 in the foamed composite molding mold 10. The results of the evaluations are shown in Table 1.

TABLE 1

| | Number of fixing positions | Degree by which urethane came around | Shifting in mold 10 |
| --- | --- | --- | --- |
| Example 1 | 1 | Unsatisfactory | Unsatisfactory |
| Example 2 | 2 | Good | Good |
| Example 3 | 3 | Good | Good |
| Example 4 | 10 | Excellent | Good |
| Comparative Example 1 | 0 | Poor | Poor |

The results shown in Table 1 reveal that a greater number of positions at which the insert material 3 is fixed by the magnetic body/bodies 11 leads to (i) a greater degree by which the polyurethane foam 2 is restricted from coming around to the exposed surface and (ii) a greater degree by which the in-mold foamed molded product unit 5 is restricted from being shifted in the mold 10.

Criteria for the evaluation of the degree by which urethane came around to the exposed surface Excellent: The length by which the urethane came around to the exposed surface was not more than 20.0 mm at all of the positions it occurred.

Good: The length by which the urethane came around to the exposed surface was more than 20.0 mm at one or two of the positions it occurred.

Unsatisfactory: The length by which the urethane came around to the exposed surface was more than 20.0 mm at three of the positions it occurred.

Poor: The length by which the urethane came around to the exposed surface was more than 20.0 mm at more than four of the positions it occurred.

Criteria for the evaluation of the degree by which the in-mold foamed molded product unit 5 was shifted in the mold 10

The degree by which the in-mold foamed molded product unit 5 was shifted in the mold 10 was evaluated by visual observation according to an index which is relative positioning of the in-mold foamed molded product unit 5 in the foamed composite molded product prepared. Then, in the evaluation of shifting, the degree of shifting was categorized into the following three levels (indicating the degree in descending order): Poor, Unsatisfactory, and Good.

REFERENCE SIGNS LIST 1, 1*a*, 1A, 1B, 1C Foamed composite molded product
2 Polyurethane foam
3 Insert material
4, 4*a* In-mold foamed molded product
4A, 4B Molded body piece
5, 5A In-mold foamed molded product unit
5*a* Exposed surface
6*a* Blind hole
6*b* Through hole
10, 10A, 10B Mold (foamed composite molding mold)
11 Magnetic body (fixing part)
12 Position fixing part (fixing part)
12*a* Engagement recess (engagement part)

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of producing a foamed composite molded product, the method comprising:
 fixing an exposed part of an insert material on a fixing part provided in a mold, wherein the insert material is inserted in an in-mold foamed molded product constituted by thermoplastic resin expanded particles;
 introducing a polyurethane liquid into the mold after fixing the exposed part; and
 producing the foamed composite molded product by foaming the polyurethane liquid in the mold,
 wherein the foamed composite molded product comprises:
  an in-mold foamed molded product unit comprising the insert material and the in-mold foamed molded product; and
  a polyurethane foam, wherein at least part of the insert material is exposed to an outside of the in-mold foamed molded product, wherein the in-mold foamed molded product unit and the polyurethane foam are integrated, and wherein a plurality of fixing parts are provided in the mold, and the plurality of fixing parts fix respective exposed parts of the insert material.

2. The method according to claim 1, wherein the insert material is exposed to the outside of the in-mold foamed molded product through at least one selected from the group consisting of:

a blind hole formed in the in-mold foamed molded product;

a through hole formed in the in-mold foamed molded product;

a gap between two molded body pieces, wherein the in-mold foamed molded product is divided into a plurality of the molded body pieces; and a perimeter of an outer surface of the in-mold foamed molded product.

3. The method according to claim 1, wherein the fixing part comprises a magnetic body, and the exposed part of the insert material is fixed by magnetically attaching the exposed part to the magnetic body.

4. The method according to claim 1, wherein the fixing part comprises an engagement part, and the exposed part of the insert material is fixed by engaging the exposed part with the engagement part of the fixing part.

5. The method according to claim 1, wherein during the fixing, a surface of the in-mold foamed molded product unit where the exposed part of the insert material is provided at the surface, is in contact with the mold.

6. A method of producing a foamed composite molded product, the method comprising:

fixing an exposed part of an insert material on a fixing part provided in a mold, wherein the insert material is inserted in an in-mold foamed molded product constituted by thermoplastic resin expanded particles, wherein the thermoplastic resin is one or more selected from the group consisting of polyolefin resin, polystyrene resin, styrene-modified polyolefin resin, olefin-modified polystyrene resin, and polyester resin;

introducing a polyurethane liquid into the mold after fixing the exposed part; and producing the foamed composite molded product by foaming the polyurethane liquid in the mold, wherein the foamed composite molded product comprises:

an in-mold foamed molded product unit comprising the insert material and the in-mold foamed molded product; and a polyurethane foam, wherein at least part of the insert material is exposed to an outside of the in-mold foamed molded product, and wherein the in-mold foamed molded product unit and the polyurethane foam are integrated.

7. The method according to claim 1, wherein introducing the polyurethane liquid is performed by pouring the polyurethane liquid onto a surface of the in-mold foamed molded product, and wherein the at least part of the insert material is exposed from an exposed surface of the in-mold foamed molded product that is opposite to the surface where the polyurethane liquid is introduced.

* * * * *